United States Patent
Tang et al.

[11] Patent Number: 6,034,791
[45] Date of Patent: Mar. 7, 2000

[54] METHOD FOR POSITIONING THE INITIALIZATION POSITION OF A LIGHT SOURCE OF AN IMAGE SCANNING APPARATUS OPERATED UNDER PASSING-LIGHT MODE

[75] Inventors: Chien-Hsing Tang; Pin-Hsu Lin; Bing-Hsiu Wu, all of Taoyuan, Taiwan

[73] Assignee: Acer Peripherals, Inc., Taiwan

[21] Appl. No.: 09/008,140

[22] Filed: Jan. 14, 1998

[30] Foreign Application Priority Data

Feb. 15, 1997 [TW] Taiwan ................................ 86101776

[51] Int. Cl.[7] ................................ H04N 1/04; H04N 1/00
[52] U.S. Cl. ...................... 358/475; 358/406; 358/487; 358/497
[58] Field of Search .................................. 358/406, 488, 358/487, 506, 494, 504, 475, 509, 497, 486, 412, 461; 250/208.1, 234–236, 559.38; 355/75, 376; 271/162, 163, 164; 399/205, 45; H04N 1/04, 1/00

[56] References Cited

U.S. PATENT DOCUMENTS

| | | | |
|---|---|---|---|
| 4,933,778 | 6/1990 | Tufano et al. | 358/488 |
| 5,245,440 | 9/1993 | Sato | 358/406 |
| 5,289,000 | 2/1994 | Toyofuku | 250/234 |

*Primary Examiner*—Cheukfan Lee
*Attorney, Agent, or Firm*—Fulbright & Jaworski L.L.P.

[57] ABSTRACT

A method for positioning the initialization position of a light source for an image reading apparatus operated under a passing-light mode is provided. A platen including a reference area that provides a pattern disposed at a position x is provided. The method comprises a first step of positioning the scan model at the position x in order to read the pattern within the reference area. Secondly, the method moves the light source toward the reference area and, at the same time, triggers the scan module to scan the image. Thirdly, repeat the second step until the image scanned by the scan module meets a pre-determined criterion. Fourthly, the method makes the light source module further move a distance of $\Delta D - \Delta d$. The $\Delta d$ is the distance traveled by the light source during an interval which begins at the capture of the pattern by the scan module and ends at the determination of the pre-determined criterion as being met.

6 Claims, 3 Drawing Sheets

METHOD FOR POSITIONING THE INITIALIZATION POSITION OF A LIGHT SOURCE OF AN IMAGE SCANNING APPARATUS OPERATED UNDER PASSING-LIGHT MODE

FIELD OF THE INVENTION

The present invention relates to a method for initially positioning the light source of an image reading apparatus.

BACKGROUND OF THE INVENTION

With the improvement of the technology, multifunctional image reading apparatus has been introduced. U.S. Pat. No. 4,879,604 discloses a scanning device with multiple functions, i.e. a reflected-light and a passing-light modes. It is known that, as the cover providing a white background for the reflected-light mode is replaced by a light source module for the passing-light mode, the multifunction image reading apparatus then can scan image on original of the type which light can pass through. The scan module within the image reading apparatus generally includes an image sensor device and a plurality of lenses. Image sensor device, or alternatively named as opto-electric converter, may be either well known CCD, or CIS, which receives the passing-light representative of the information on the original.

During the passing-light mode scanning process, the light source module for the passing-light mode moves in synchronization with the scan module along the original to be scanned and a fixed relative positional relationship between them are retained.

Generally, the scan module of the image reading apparatus will be reset or positioned at an initialization position upon power-on of the apparatus, or, is driven to the initialization position after completion of each pass of scanning process. Only when the scan module is positioned at the correct initialization position, the image data obtained are truly correct data corresponding to the correct portion of the original. Furthermore, under the passing-light mode, the light source module must also be initially positioned correctly; otherwise, the quality of the scan will be adversely affected. Accordingly, before the image reading apparatus conducts a passing-light mode scanning, the scan module is firstly positioned at a correct initialization position. Afterwards, the light source module is positioned to an initialization position. As well known in the arts, the conventional light source module includes a position sensor for positioning the light source module at an initialization position. Particularly, when the light source moves to a position which corresponds to and actuates the sensor, a signal from the position sensor is sent to a processor for instructing the scanning module to stop at the preset initialization position.

However, when implementing the above mentioned design, complexity with respect to design, manufacturing as well as assembly are involved. Furthermore, the yield rate drops due to its precision requirement involved during the assembly. If the position sensor and/or the actuator malfunctions during the scanning process, the overall result of such scanning process is considered as fail. Besides, more components in a design means higher cost.

Referring to FIG. 1$a$, the influence of distance of the light travels on the illumination value will be described. According to the well known optical theory, since distance DOA>distance DOB>distance DOC, when those points A, B and C are both exposed under the same light source, the illumination intensity on those three points is IA<IB<IC. Similarly, since distance DOE>distance DOD>distance DOC, the illumination intensity on points E, D and C is IE<ID<IC. In conclusion, point C has the brightest illumination intensity.

Referring to FIG. 1$b$, the influence of the incident angle to the illumination intensity will be further described. Since the ∠AOC>∠BOC>∠COC, when the same light source emits a light beam from points A, B, and C, respectively, the illumination intensity at point O due to the light source at point C is larger than that at point O due to the light source at point B. And the illumination intensity at point O due to the light source at point B is larger than that at point O due to the light source at point A. Similarly, since ∠EOC>∠DOC >∠COC, when the same light source emits a light beam from points E, D, and C, respectively, the illumination intensity at point O due to the light source at point C is larger than that at point O due to the light source at point D. And the illumination intensity at point O due to the light source at point D is larger than that at point O due to the light source at point E. In conclusion, point O has the brightest illumination intensity from the light source located on point C.

In light of the above observation, when there is no original or document on the document platen, the smaller of the light travel distance is and the smaller of the incident angle is, the brighter of the illumination intensity sensed by the scan module will be.

Based on the basic function of the image reading apparatus, the invention employs the principle recited above in positioning the light source module at its initialization position.

SUMMARY OF THE INVENTION

It is the object of this invention to provide a method that utilizes the scan module to determine the initialization position of the light source. The design, assembly can be simplified and manufacturing cost can be reduced.

The method which positions the light source at a initialization position distanced from the position x by amount of $\Delta P$ comprises the first step of positioning the scan module at the position x for scanning image within the reference area. Secondly, the method moves the light source toward the reference area and, at the same time, triggers the scan module to scan image. Thirdly, repeating step (2) till image scanned by the scan module meets a pre-determined criterion. Fourthly, the method makes the light source module further move a distance of $\Delta P - \Delta d$, wherein the $\Delta d$ is the distance traveling by the light source during an interval which begins at the capture of image by the scan module and ends at the determination by a microprocessor of the pre-determined criterion as being met.

BRIEF DESCRIPTIONS OF DRAWINGS

FIG. 1$a$ shows the influence of the light travel distance to the illumination intensity;

FIG. 1$b$ shows the influence of the incident angle of light beam to the illumination intensity;

DETAILED DESCRIPTION OF PREFERRED EMBODIMENT

Figure 2:
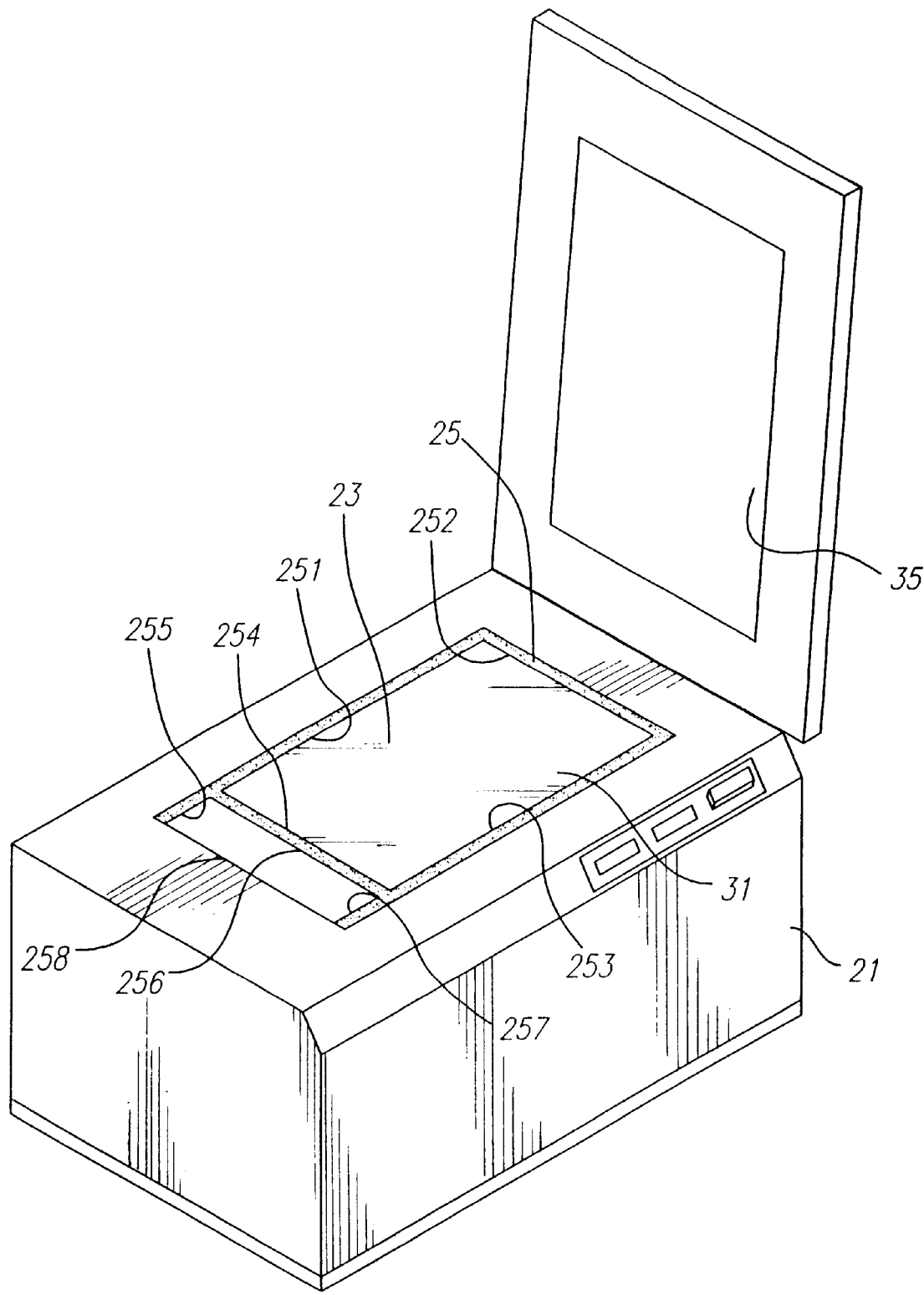
FIG. 2 shows the upper housing of the image scanner apparatus and the positioning jig for the original to be scanned.

Referring to FIG. 2, in general, before the image scanning is performed, a jig 25 for positioning the original to be scanned is disposed onto the platen, i.e. transparent glass 23, and along the perimeters of the transparent glass 23. As shown, the positioning jig 25 includes four edges 251, 252, 253 and 254 and the original to be scanned is disposed within the area defined by these four edges. On the other hand, a well-known reference white area is defined by the edges 255, 256, 257 and 258. This reference white area serves the purpose of allowing the light from the light source to be directly received by the image sensor device(or alternatively named as opto-electric converter) during the power-on period of the image reading apparatus for reference white calibration. The opto-electric converter could be either the well known CCD, or CIS. This reference white area shall be free of any obstacle that may block the light. The present invention takes this already existing reference white area together with the following procedure to position the light source for passing-light mode scanning process.

In the initial short starting period of a scanning process, the scanning module is in an accelerated condition before an constant velocity is reached. Therefore, during this acceleration period, the scanning module can not scan the image, otherwise the image scanned within this interval will be deformed. In light of this concern, the initialization position of the scanning module is located at a $\Delta D$ distance relative to the edge 254. $\Delta D$ is a predetermined displacement of the scanning module moving from its initialization position to a position from that the scanning module is ready to scan. The predetermined displacement $\Delta D$ may include other mechanical considerations than the acceleration period mentioned above.

Figure 1A:
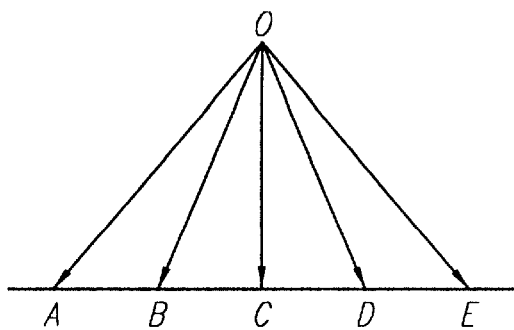
Figure 1B:
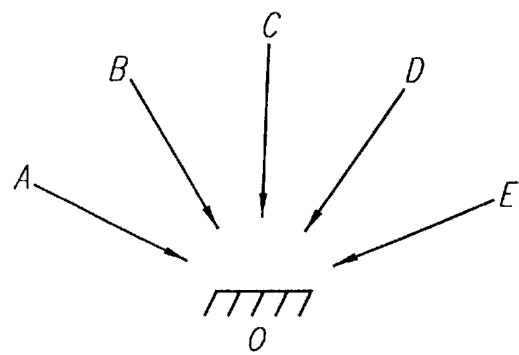
Figure 3:
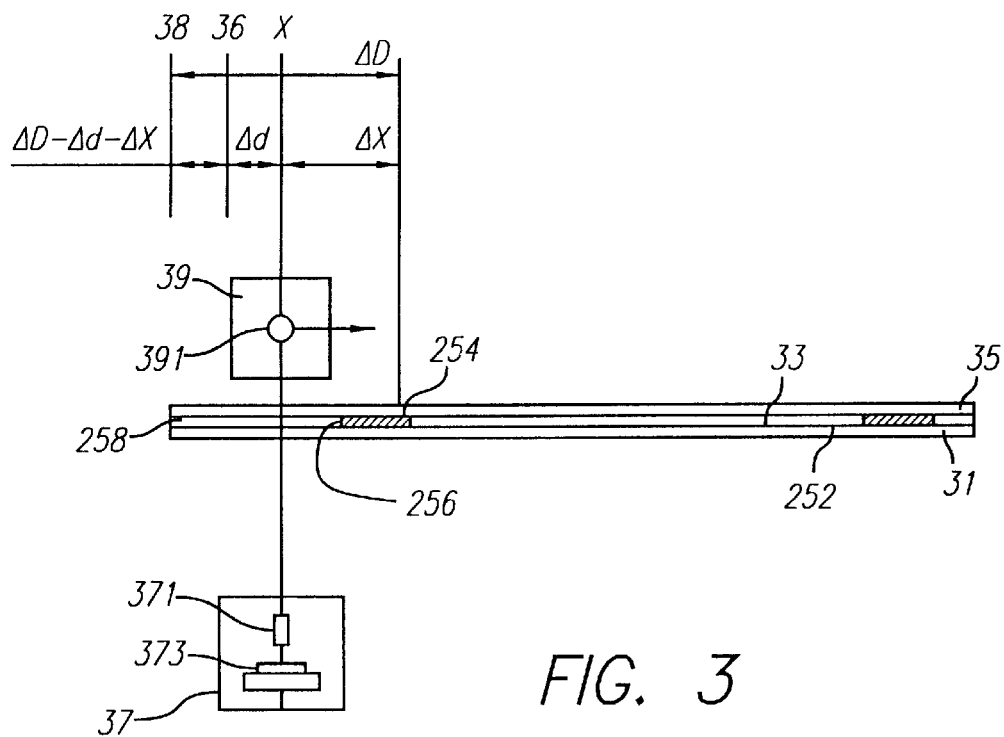
FIG. 3 shows the distance relationship between the light source, scan module, platen for original, and the light initialization positioning line.

Since, as mentioned above, the light source module for the passing-light mode moves in synchronization with the scan module along the original, the positioning method of the invention is to position the light source 391 at a location distanced from the edge 254 by an amount of $\Delta D$, as shown in FIG. 3. In other words, the line 38 is the predetermined initialization position for the light source 391.

Disclosed in FIG. 3 are the light source module 39, scan module 37, lens 371, image sensor 373, platen 31, original 33 to be scanned, the glass plate 35 of cover including the light source module 39. As shown in FIG. 3, the reference position x is a position at which the scan module is initialized whenever the initialization process of the light source is performed. This reference position x is distanced from the edge 254 of the positioning jig 25 by amount of $\Delta x$. The positioning line 36 is the location at which the light source 391 stands as the microprocessor determines the image scanned by scan module 37 has met a criterion.

The distance $\Delta d$ exists because, before the determination of the pre-determined criterion as being met, it takes the microprocessor amount of time of $\Delta t$. During this $\Delta t$ interval, the light source 391 keeps moving a corresponding displacement of $\Delta d$.

As shown in FIG. 3, when the image obtained by the scan module has been determined to meet the criterion preset, the light source 391 should travel another distance of $\Delta D - \Delta d - \Delta x$ to reach the initialization positioning line 38.

Figure 4:
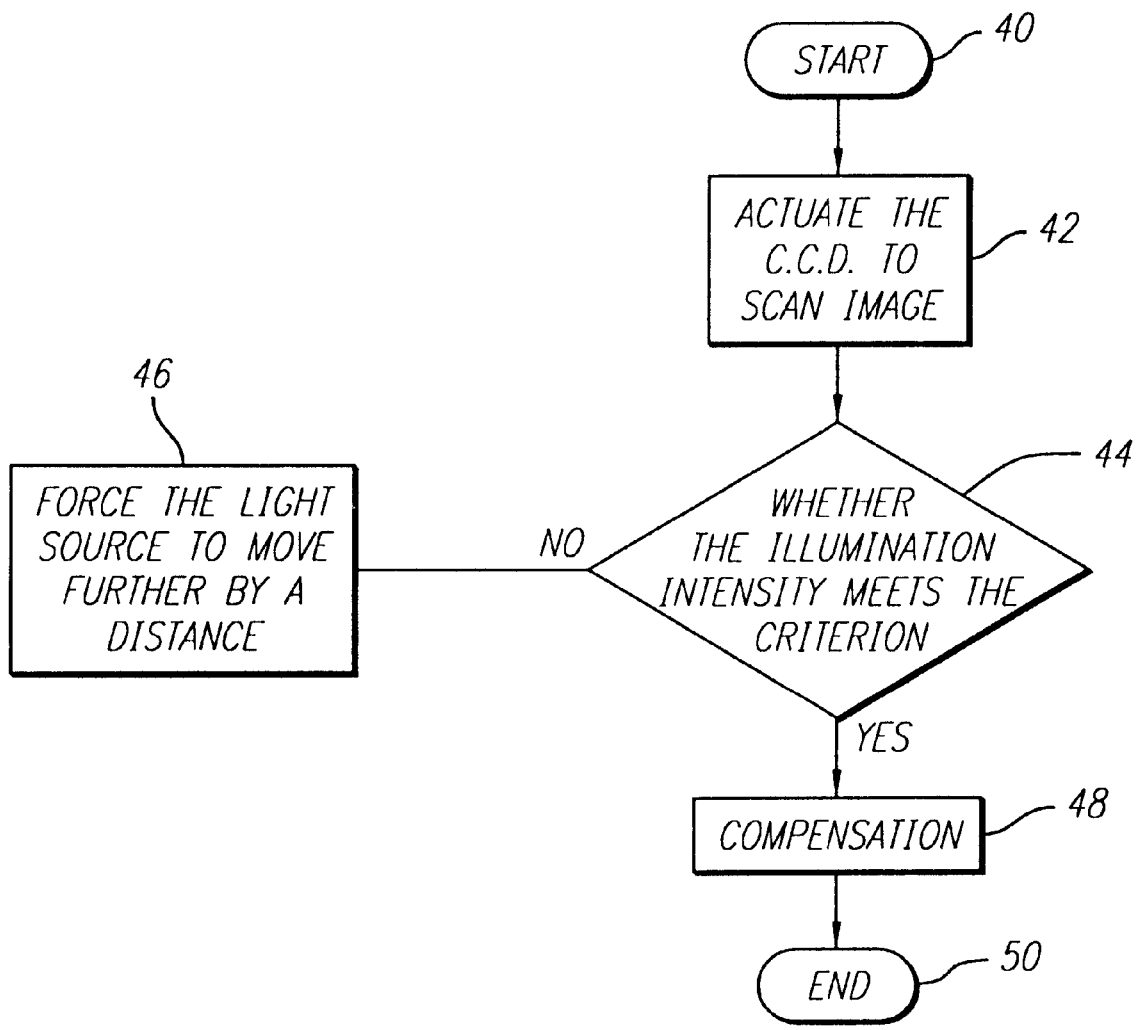
FIG. 4 shows the flow chart of the present invention.

FIG. 4 shows the flow chart of the present invention. Step 40 is the starting point of the initialization positioning process of the light source 391. In step 42, the scanning module 37 starts the image sensor 373, i.e. CCD, to scan the image. In step 44, the process determines whether the illumination intensity detected meet the pre-determined criterion. If the result of block 44 is No, the process goes to step 46. In step 46, the light source 39 is forced to move further by one predetermined distance. In general, if the scan resolution is 300 dpi, the predetermined distance is ($\frac{1}{300}$) inch. Afterwards, the process returns to step 42. This loop will continue until the microprocessor determines that the illumination intensity detected meets the pre-determined criterion in step 44. In other words, if the result of block 44 is Yes, the process goes to step 48. In step 48, the light source module 39 moves further by a displacement that equals to $\Delta D - \Delta d - \Delta x$. In the preferable embodiment of the $\Delta x$ being zero, the light source module 39 moves further by a displacement that equals to $\Delta D - \Delta d$. The step 50 is the end of the initialization process.

The are several algorithms available to be applied as the criterion mentioned in the step 44 of the flow chart. As the reference area defined by edges 255, 256, 257, 258 is the conventional reference white area, the straight forward one is a predetermined threshold value for the illumination intensity. In an alternative, the criterion is the illumination value obtained by the scan module becoming decrement from increment, i.e. the illumination value is decreasing from its maximum value.

Alternatively, the reference area can be designed as including a plurality of black/white stripes. However, if pattern of the black/white stripes is adopted, this pattern can not share with the conventional reference white area. And as pattern of the black/white stripes is adopted, the criterion may be that the image obtained by the scan module is substantially same as the black/white stripes.

From the forgoing descriptions, it can be readily appreciated that, by the present invention, the initialization positioning of the light source module is readily achieved by the existing basic functions of the light source together with the scan module.

The present invention is concluded with the following advantages.

1. The design and assembly work is simplified. As the position sensor and corresponding wiring within the conventional passing-light mode module are eliminated, the design and/or the assembly work are simplified. The overall configuration is simplified and more space are left for other design consideration.

2. The overall manufacturing cost is lowered. As the position sensor, the corresponding wiring and connections within the conventional passing-light mode module are eliminated, the manufacturing cost is lowered accordingly.

3. The fail rate of the scanning apparatus is lowered. It is agreed that the more the component number, the higher the fail rate. By the provision of the present invention, the position sensor is eliminated. The yield rate of the image reading apparatus increases and less maintenance is required.

While the preferred embodiment of the present invention has been illustrated and described above, it would be obvious to those skilled in the art that various changes and modifications can be made without departing from the spirit and scope of the invention.

We claim:

1. A method for positioning a light source within an image reading apparatus operated under a passing-light mode, the image reading apparatus including a scan module, a microprocessor for processing signal obtained from said scan module, and a platen for supporting an original to be scanned, said platen including a reference area providing a pattern which is disposed at a position x, the scan module moving corresponding with the light source during the passing-light mode operation and light generated from the light source passing through the platen and being received by the scan module, the method positioning the light source at an initialization position distanced from said position x by an amount of $\Delta P$, said method comprising the steps of:

(1) positioning said scan module at the position x for reading said pattern within said reference area;

(2) moving said light source toward said reference area and, at the same time, triggering said scan module to scan image;

(3) repeating step (2) until the image scanned by the scan module meets a pre-determined criterion; and (4) making said light source module further move a distance of $\Delta P-\Delta d$, wherein the $\Delta d$ is the distance traveled by the light source during an interval which begins at the capture of said pattern by said scan module and ends at the determination by said microprocessor of the pre-determined criterion as being met.

2. A method as recited in claim 1, wherein the position x is distanced from an edge of said platen by an amount of $\Delta x$, wherein, in step (4), $\Delta P=\Delta D-\Delta x$, wherein $\Delta D$ is a predetermined distance said scan module travels from said initialization position to a position said scan module is ready to scan.

3. A method as recited in claim 1, wherein said pattern is a reference white plate.

4. A method as recited in claim 3, wherein in step (3) said criterion is the illumination value obtained by said scan module being larger than a predetermined threshold.

5. A method as recited in claim 3, wherein in steps (3) said criterion is the illumination value obtained by said scan module becoming decrement from increment.

6. A method as recited in claim 1, wherein the positional relationship between the scan module and the light source is retained during the passing-light mode operation.

* * * * *